Nov. 19, 1940.   C. B. KURTZ   2,221,976
CONTROL MECHANISM
Filed Feb. 23, 1937   3 Sheets-Sheet 1
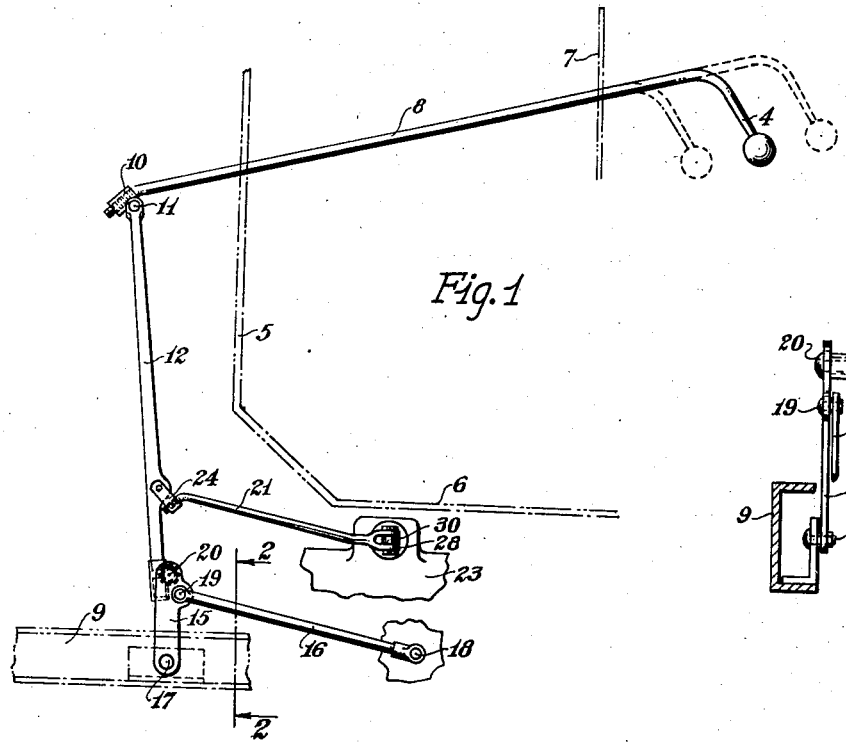
INVENTOR.
CYRUS B. KURTZ.
BY Richey & Watts
ATTORNEYS

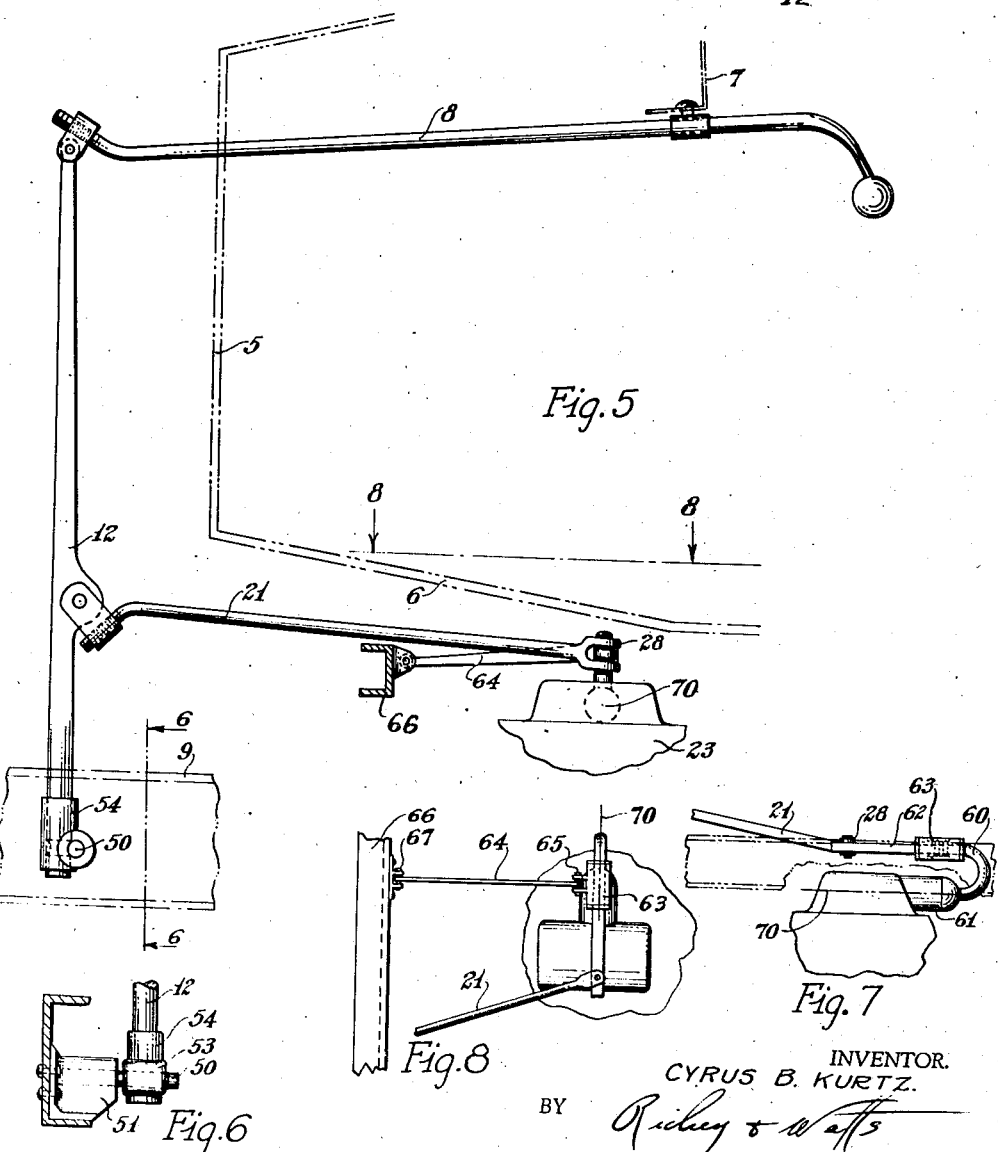

Nov. 19, 1940.   C. B. KURTZ   2,221,976
CONTROL MECHANISM
Filed Feb. 23, 1937   3 Sheets-Sheet 3

INVENTOR.
CYRUS B. KURTZ.
BY
ATTORNEYS.

Patented Nov. 19, 1940

2,221,976

UNITED STATES PATENT OFFICE 2,221,976

CONTROL MECHANISM

Cyrus B. Kurtz, Lakeside, Ohio

Application February 23, 1937, Serial No. 127,011

14 Claims. (Cl. 74—473)

This invention relates to control mechanism and is exemplified herein and more particularly described in an improved selective gear control mechanism for use in a motor vehicle.

The control mechanism of the instant application corresponds generally in its operative functions to the control mechanism shown in my copending application Serial No. 16,228, filed April 13, 1935, and constitutes a continuation in part of said application.

The present invention also constitutes an improvement upon the mechanism of my co-pending application in various respects as will appear from the following disclosure. One particular improvement lies in the provision of means by which the obstruction created by the common type of gear shift lever can be substantially eliminated from the operator's compartment, which means are readily adaptable for convenient installation in a motor vehicle of common and standard construction.

In the manufacture of motor vehicles, it has become common practice to mount the motor in the vehicle frame on resilient supports to cushion the frame and motor with respect to each other to prevent the transmission of vibrations and torque reactions therebetween. It is also desirable and conventional to construct the motor and transmission as a unit and where such construction is combined with a resiliently mounted motor the transmission mechanism and motor oscillate and move in unison with respect to the frame and body of the vehicle.

The transmission mechanism is usually provided with an upstanding gear shift lever which projects upwardly from the transmission through the floor boards of the body of the vehicle and is arranged centrally of the vehicle operator's compartment. This gear shift lever which is in a position conveniently accessible to the operator is commonly actuated by the operator longitudinally and laterally through what is known as an H-shift to select the desired gear ratio.

Such a transmission gear shift lever mounted as above described oscillates in unison with the transmission mechanism connected to the power unit and the lower end of the lever being mounted near the axis of oscillation of the power unit, the upper end of the gear shift lever has movements imparted thereto of considerable magnitude. This lever movement is obviously objectionable and dangerous.

Numerous attempts by others have been made to eliminate the obstruction of the upright gear shift lever through the medium of electromagnetic actuators, Bowden wire units, cables and like structures to operate the gear selector from the vehicle dash or instrument panel or other point convenient to the operator. As a practical matter such attempts have been attended by expensive constructions on the one hand or uncertain results on the other.

For the purpose of illustrating and describing my invention I will refer to it in the environment of a motor vehicle of the resiliently mounted motor type above described, but those skilled in the art will appreciate that the application of the principles of my control mechanism or the mechanism itself may well be adapted to rigidly mounted motors and to other and varied uses.

It is among the objects of my invention to provide a control mechanism for motor vehicles adapted to be mounted in a position conveniently accessible to a motor vehicle operator which will transmit the voluntary gear shifting movements of the operator to a speed change mechanism arranged beneath the floor of the vehicle and will compensate for such involuntary movements as a speed change mechanism may have with respect to the body of the vehicle. A further object is to substantially eliminate the obstruction in the driver's compartment incident to the location and operation of the present common and standard form of upright lever. It is a further object of my invention to provide a control mechanism in accordance with the preceding objects which is adapted for convenient attachment to the conventional gear shift stack projecting upwardly into the vehicle operator's compartment. A further object is to provide a gear shifting control mechanism which is readily adapted for coactive operation with boosting or servo mechanism by virtue of which the driver's force and motion may be substantially reduced. It is a further object of my invention to provide a control mechanism which includes a transmission gear shifting ball lever arranged to project laterally of the transmission gear case. It is a further object of my invention to provide a control mechanism in accordance with the preceding object in which the ball lever is provided with means to compensate for movements of the transmission casing with respect to the vehicle body. Further objects relating to simplicity in construction and economies of manufacture will become apparent from the following description and the appended drawings wherein:

Figure 1 is an elevation of a control mechanism according to my invention applied to an automobile transmission;

Figure 2 is a partial sectional view taken along the line 2—2 of Figure 1;

Figure 3 is an enlarged plan view with parts in section of a ball lever mounting comprising part of the control mechanism of Figure 1;

Figure 4 is a transverse sectional view of the ball lever mounting shown in Figure 3;

Figure 5 is an elevation of a modified form of control mechanism and ball lever assembly;

Figure 6 is a sectional view taken along the line 6—6 of Figure 5;

Figure 7 is an elevation of the transmission and ball lever mounting looking forwardly of the vehicle;

Figure 8 is a partial plan view taken as indicated by line 8—8 of Figure 5;

Figure 10:
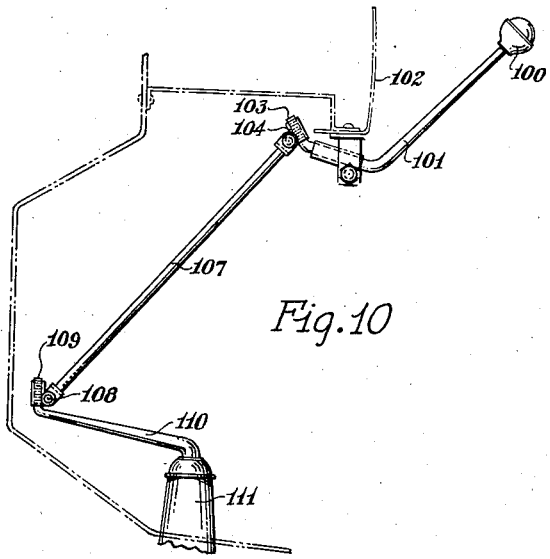
Figure 10 is an elevation of a further modification of the control mechanism according to my invention.

Referring to the drawings the form of control mechanism shown in Figure 1 corresponds generally to that shown in my said co-pending application in that the control mechanism of Figure 1 includes an articulated linkage assembly having a rocking lever arranged forwardly of the motor vehicle dash and a longitudinal lever extending therefrom beneath the floor boards of the vehicle. The embodiment of my invention illustrated in Figure 1 is particularly well suited for motor vehicles having "floating power" or other similar devices which permit a limited movement between the power unit and frame or body of the vehicle.

The motor vehicle dash is indicated in phantom outline as at 5, the floor boards as at 6, the instrument panel 7 and the manually operable or actuating rod 8 is slidably supported by the instrument panel 7 and/or the dash 5 to extend from the operator's compartment of the vehicle forwardly through the dash. A rocking lever 12 is preferably supported by the vehicle frame 9 through the medium of a pivoted frame bracket 15 and is connected through a pivoted clevis 10 to the forward terminus of the actuating rod 8. The clevis 10 includes an internally threaded sleeve to receive a threaded bent end portion of the rod 8 and an offset boss apertured to receive the pivot pin 11 extending transversely of the axis of said internally threaded sleeve. This construction provides that the bent end portion of the rod 8 may rotate through its inter-threaded connection and swing the clevis 10 bodily to impart a rotational movement to the rocking lever 12 about the longitudinal axis thereof. To provide for the rotational movement of the rocking lever 12 above referred to the lower end thereof is mounted for free rotation on the supporting sleeve 13 which sleeve is in turn rotatably supported through a transversely arranged interconnected sleeve 14 carried by the frame bracket 15. A transmission rod or actuated rod 21 is arranged to extend forwardly from the transmission 23 and have a pivoted clevis connection as at 24 with the rocking lever 12 adjacent the lower end thereof. The clevis 24 like the clevis connection 10 is secured to the lever through a pivot pin extending transversely of the longitudinal axis of the lever 12 and like the clevis 10 is internally threaded to receive a bent end portion of the actuated rod 21.

Disregarding for the moment the compensating functions of the bracket 15 and its reaction link 16, it will be observed that a longitudinal shifting movement of the rod 8 imparted thereto by the vehicle operator will rock the lever 12 upon its pivoted sleeve mounting as at 14 and reciprocate the actuated rod 21 and that a rotational movement imparted to the actuating rod 8 will through the clevis connections 10 and 24 and the rotation of the lever 12 in sleeve 13 impart a rotational movement to the rod 21. The rotational movement in the rod 21 is effective through the forked end 28 thereof to impart a tilting or rocking movement to the ball lever 30 of the transmission and effect a gear selecting action therein more fully described hereinafter. A gear shifting movement is produced in the ball lever 30 by the longitudinal movements of the rods 8 and 21 and a rocking of the lever 12.

To compensate for involuntary bodily movements of the transmission with respect to the frame and body of the vehicle, I have provided the lever supporting mechanism including the bracket 15, which is pivoted to the frame as at 17, and the link 16, which is pivoted to the transmission or power unit as at 18. In the event that the motor is moved longitudinally of the vehicle by torque reactions between the motor vehicle or inertia of the motor during vehicle acceleration, it will be observed that the link 16 will move with the motor and rock the bracket 15 upon its pivot 17 in the frame in a manner which will carry the pivot pin 20 and the sleeve bearing 14 for and aft in unison with the motor movements. The distance between the pivot points 20 and 17 and 20 and 19 is proportioned with respect to the rocking lever 12 and its inter-pivoted connections to maintain a balanced leverage arrangement, and thus merely rock the lever 12 about its upper pivot connection 11 during longitudinal motor movements. The vertical movements of the motor with respect to the frame merely swing the lower rod 21 about its clevis connection 24 with the rocking lever 12, and thus it will be observed that the control mechanism compensates for motor movements so that voluntary gear selecting or gear shifting movements of the handle 4 by the vehicle operator will not be effected by the involuntary motor movements.

A further advantage of the control mechanism according to my invention is obtained by providing the transmission with a ball lever which is arranged to project from the side of the transmission gear case 23. It will be understood that this arrangement does away with the conventional vertical ball lever stack ordinarily projecting through the floor boards of the automobile and that with my arrangement of ball lever the floor boards may be lowered to a position immediately adjacent the transmission case. To attain the above mentioned advantages I prefer to extend the stack 33 of the transmission laterally and mount therein through the ball socket 34 a horizontally extending ball lever 30 provided with a gear selecting ball or knob 35 at its inner end and a spaced rounded gear selecting knob 36. A pair of spaced yoke shifting bars 41 and 42 are provided with suitable sockets 37 and 40 respectively to selectively receive the gear selecting and maintaining knobs 35 and 36. As indicated in Figure 3 the ball lever is in a neutral position and may be shifted into planes 31 or 32 to establish and maintain any of four selective speeds, such as 1st, 2nd and 3rd speed and reverse drive.

The selecting motion of the ball lever is obtained by a swinging of the lever 30 in a vertical plane as shown in Figure 4; that is when the ball lever is rocked into its dotted line position the knob 35 at the inner end of the rod is raised into the plane of the socket 40 on yoke bar 42. When the ball lever is in its dotted line position of Figure 4 is shifted to the plane indicated at 31 in Figure 3 the knob 35 moves the yoke bar 42 to establish a 1st speed drive as indicated in the legend "1st" in Figure 3. Moving the ball lever into the plane indicated at 32 will establish a reverse drive as indicated in the legend "Rev." of Figure 3. By moving the ball lever into the planes 31 and 32 when the same is tilted to its full line position of Figure 4 the selecting knob 36 will operate to move the yoke bar 41 to establish a second or third speed drive as indicated by the legend "2nd" and "3rd" in Figure 3. The neutral position of the ball lever is shown in its full line position of the lever in Figure 3. Preferably a light compression spring 45 is arranged within the transmission to act through pin 46 in a manner to urge the inner end of the ball lever 30 downwardly and compensate for the weight of the rod 21 pivoted to the outer end of the ball lever, as well as facilitate the shift across the H from 1st to 2nd speeds.

In that form of my invention illustrated in Figures 5 to 8, inclusive, I have shown another method of compensating for the involuntary or "floating power" motor movements. Since the gear shifting, and gear selecting movements imparted to the articulated control linkage correspond substantially to that in the embodiment of Figure 1 I have identified the parts with corresponding numeral characters. In this embodiment of my invention, however, the rocking lever 12 is preferably supported on the frame by a laterally extending pivot pin 50 carried by frame bracket 51, and thus the rocking lever and its interconnected rod 21 do not partake of any longitudinal motor movements with respect to the frame. The pin 50 is arranged to extend transversely of the frame and into a sleeve 53 similar to the sleeve 14 of the embodiment of Figure 1, which is integrally secured to a vertically extending sleeve 54 which in turn rotatably receives the rocking lever 12. The end of the actuated rod 21 is provided at its point of connection with the transmission mechanism with a fork 28 as in the embodiment of Figure 1 which embraces the free end of a U-shaped ball lever 60.

Preferably the transmission is provided with a laterally extending ball lever support as at 61 and the mechanism within the transmission may correspond substantially to that described in connection with the description of Figures 3 and 4. The ball lever 60 may be conveniently formed as a U-shaped rod with the legs of the U extending horizontally, preferably in the same vertical plane, and having one leg within the transmission housing, the bight portion of the U curved upwardly and the other leg of the U extending horizontally and overlying that portion within the housing. The upper side of the U-shaped ball lever 60 is identified as at 62 and the free end thereof is secured to the actuated rod 21 at 28. A reaction sleeve 63 is journalled on the portion 62 of the ball lever, preferably in vertical alignment with the center of the ball of said lever. A reaction link 64 secured to said sleeve as at 65 extends forwardly from the sleeve to a point of pivotal connection on a frame or body member 66 as at 67. In the event that the torque or other reactions between the motor and the frame of the vehicle result in a longitudinal movement of the transmission 23 with respect to the frame, the reaction link 64 will maintain the axis of the upper leg portion 62 of the ball lever in a substantially fixed position and permit the lower leg of the ball lever to roll upon its axis indicated at 70 and move fore and aft with the transmission without any substantial tendency for bodily displacement relative to the parts therein. The mere rotation of the ball lever on the axis 70 is ineffective to produce any gear selecting or gear shifting movement of the ball lever. The connection 28 between the rod 21 and leg 62 is free enough in the plane of the rod to permit the movement above described. Movement of the transmission with respect to the frame and body of the vehicle other than or in addition to fore and aft movement may be accommodated and dissipated by the swinging of the longitudinal rod 21 and reaction link 64 about their pivotal connections with the rocking lever 12 and frame respectively in a manner similar to that described in connection with the species of Figure 1.

Although the control mechanisms of Figure 1 and Figure 5 and those control mechanisms shown and claimed in my said copending application are well suited for installation where it is desired to have the driver's compartment free of links and connections, I appreciate that my invention is suited to installations where a part or all of the actuating mechanism is arranged within the body of the vehicle. Accordingly I have shown in Figures 9 and 10 an improved arrangement of a control mechanism according to my invention which is particularly suited for replacement of the conventional gear shift lever projecting upwardly into the vehicle driver's compartment.

Figure 9:
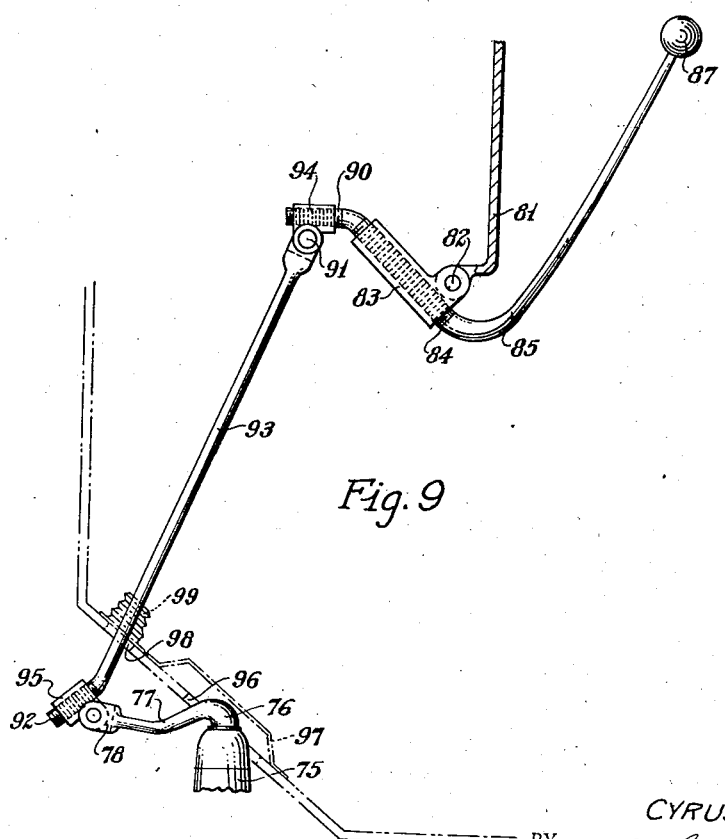
Figure 9 is an elevation showing another form of my control mechanism.

The species of Figure 9 is particularly well suited to motor vehicles wherein the ball lever stack 75 is in the forward part of the driver's compartment adjacent the dash. The conventional ball lever may be cut off and bent to the form of or replaced with a ball lever 76 having a laterally bent end 77 provided at its terminus with a fork 78, as shown. I prefer that the restraint usually imposed on the common form of ball lever, which prevents rotation upon its own axis, while permitting movement in the H shift be retained in this and the next following form of my invention. Adjacent the motor vehicle instrument panel 81 and preferably supported thereby as at 82 is a rocking and swinging lever 85. To support the lever 85 for rocking movement about the pivot connection 82 the sleeve 83 is preferably internally threaded to receive a threaded portion 84 of the lever. Such an interthreaded connection or other suitable pivotal mounting permits the lever to rotate or swing on an axis coincident with the axis of the sleeve 83. One end of the rocking lever 85 is provided with a ball handle 87 and the other end is bent at an angle to the swinging axis as at 90. As shown in Figure 9 the end 90 would have to be bent after the lever was threaded into the sleeve 83.

The gear selecting and gear shifting movements of the rocking lever 85 are transferred to the ball lever 76 through the rod 93 and the clevis connections 94 and 95 at each end thereof. The clevis 94 at the upper end of rod 93 is provided with an internally threaded sleeve to receive the threaded bent end 90 of the rocking lever 85 and has an integrally formed boss to receive the pivot pin 91 extending transversely of the longitudinal axis of the rod 93. The clevis 95 is similarly constructed and is arranged to receive the lower end of rod 93 which is bent as at 92.

Preferably the floor board is cut away as at 96 to permit movement of the forward extension of the ball lever and the cut away floor board and ball lever stack are thereafter covered with a shield as at 97. The floor board aperture 98 which receives the rod 93 may be provided with a flexible dust boot as at 99.

In that form of my invention shown in Figure 9 the handle 87 may describe the conventional H-shift movements to establish the conventional forward speeds and reverse drive in the transmission. When the lever 85 is manually swung transversely of the vehicle, the threaded portion 84 rotates within the sleeve 83, and this rotation is transmitted to the ball lever in a manner effecting a gear selecting movement with the transmission case. A fore-and-aft movement of the handle 87 results in a rocking of the lever 85 upon the pivot 82 and this rocking movement produces in the ball lever 76 a gear shifting movement.

In those vehicles where the ball lever stack projects a substantial distance above the floor boards and is spaced further from the dash, the disposition of control mechanism of Figure 10 may be conveniently employed. In this form of my invention a rocking lever 101 is pivotally supported by the instrument panel 102 in a manner to permit rocking and swinging thereof substantially in the manner described in connection with the species of Figure 9. The panel may be appropriately braced as shown. The forward end of the rocking lever is bent as at 103 and through a clevis 104 transmits the gear selecting and gear shifting movements of the lever 101 to the depending rod 107.

The conventional ball lever is cut off and bent or replaced by the ball lever 110 which is bent to extend forwardly of the vehicle from the stack 111. The forward end of the ball lever is bent upwardly as at 109 and said bent end connected to the rod 107 through clevis 108. Preferably the clevis connections 104 and 108 are constructed and operate substantially the same as the clevis connections described in the other embodiments of my invention.

In operation the control mechanism of Figure 10 corresponds substantially to that of Figure 9 in that the ball handle 100 on rocking lever 101 may describe the conventional H-shift. It will be noted, however, that in the species of Figure 10 the rod 107 carries the transverse clevis pins at each end thereof whereas the rod 93 of the species of Figure 9 is bent at its lower end for the clevis connection. From an appreciation of the functions of the clevis and bent end connections it will be understood that the rocking lever and ball lever of each species (Figure 9 or Figure 10) may be connected in the manner shown in the drawings for the other specie. For reasons of economy of manufacture and simplicity of assembly the connection between the ball lever and the rocking lever shown in Figure 10 is preferred.

Those skilled in the art will understand that whereas the rods 93 and 107 each tend to transmit pure rotational motion to the adjacent ends of the levers 76 and 110 respectively for gear selection, unless the ends of the rods happen to lie in a plane about normal to the axis of the stack and the portion of the ball lever therein contained, rotation of the rods 93 and 107 may also cause a limited and not undesirable horizontal swinging motion of the respective adjacent ends of the levers 76 and 110 as an incident to the transverse vertical and selective swinging movement of those ends of those levers contained within the stacks.

In the forms of my invention shown in Figures 9 and 10, it will be seen that many and much of the bodily movements of the stacks supporting the ball levers 76 and 110 will be dissipated in the involuntary movement of the knobs 87 and 100. Conversely involuntary movements of the stacks will not impair or conflict with voluntary movements desired to be transmitted in selecting and shifting the gears.

It will also be appreciated that in all forms of my invention the H of the shift may be flopped from conventional form to a form in which the knob, for example, 87, may take a position to the left as distinguished from a position to the right in "high" gear by flopping one of the clevis connections adjacent the bent portion of any of the rods. In all forms of my invention herein disclosed the space within the driver's compartment, particularly in the neighborhood of the floor boards above and adjacent the transmission is cleared of harassment and encumberance of the conventional gear shift lever protruding upwardly therefrom. In all the forms of my invention herein disclosed it will be appreciated that suitable booster mechanism can be connected with the control mechanism to aid in the work, particularly of shifting the gears. Particularly in the forms of my invention shown in Figures 9 and 10 space is provided or obtained underneath the "cowl" of the vehicle for such booster mechanism as may be desired to be attached to aid in the work of gear shifting. I contemplate that where booster mechanism is used I may, for example, correspondingly reduce the travel of the upper levers 85 and 101 respectively necessary for the gear shifting movement.

Although I have shown and described several embodiments of my invention in considerable detail it will be appreciated that numerous modifications may be made therein by those skilled in the art without departing from the spirit of my invention as defined by the following claims.

I claim:

1. In a motor vehicle, a frame and body assembly, a power unit mounted to move with respect to said assembly and including a transmission arranged to be controlled and actuated from within said vehicle body, a rockable lever arranged to be actuated from within said body, means carried by said frame and body assembly for mounting said lever for rotation on its own axis and upon an axis transversely thereto, a rod operatively connected to said lever at one end thereof and to said transmission at the other end thereof to convert the rotation of said lever upon said axes to gear selecting and gear shifting movements in said transmission and a reaction link secured to said power unit and said means to compensate for power unit movements with respect to said frame and body.

2. In a motor vehicle, a frame and body assembly, a power unit mounted to move with respect to said assembly and including a transmission arranged to be controlled and actuated from within said vehicle body, a rockable lever arranged to be actuated from within said body, means jointly supported by said frame and body assembly and said power unit for mounting said lever for rotation on its own axis and upon an axis transversely thereto, a rod operatively connected to said lever at one end thereof and to said transmission at the other end thereof to convert the rotation of said lever upon said axes to gear selecting and gear shifting movements in said transmission.

3. In combination, a motor vehicle having a frame and body and a motor therein mounted for limited movement with respect to said frame and body, a transmission having a ball lever carried by said motor to move therewith and a control mechanism for said transmission comprising a rocking lever supported by said frame to rotate about the longitudinal axis of said rocking lever and about an axis transverse with respect to said longitudinal axis, an actuating rod extending generally longitudinally of the body and supported thereby for movement in the direction of its length and for rotational movement, one end of said rod provided with a handle conveniently accessible to the vehicle operator and the other end of said rod secured to said lever, means connecting said lever and transmission to transmit lever movements to said transmission ball lever and a reaction means arranged between said ball lever and said frame to maintain the position of a part of said ball lever irrespective of movements of the transmission relative to the frame and body.

4. In combination, a motor vehicle having a frame and body and a motor therein mounted for limited movement with respect to said frame and body, a transmission carried by said motor to move therewith and a control mechanism for said transmission comprising a lever mounted on said frame to rotate about the longitudinal axis of said lever and about an axis transverse with respect to said longitudinal axis, an actuating rod extending generally longitudinally of the body and supported thereby for movement in the direction of its length and for rotational movement about its longitudinal axis, one end of said rod provided with a handle conveniently accessible to the vehicle operator and the other end of said rod operatively connected to said lever, an actuated rod extending generally longitudinally of the vehicle and secured at one end thereof to said lever and at the other end thereof to a transmission ball lever, a reaction link secured to said ball lever and said frame to maintain the position of a part of said ball lever irrespective of movements of the transmission relative to the frame and body.

5. A transmission control mechanism including a transmission having a ball lever stack extending transversely of the vehicle, a U-shaped ball lever in said stack arranged to have one side of said U extending within the transmission and the other side thereof to overhang that side within the transmission, an actuated gear selecting and gear shifting member connected to said overhanging ball lever portion and a reaction member secured to said overhanging portion to maintain the position of said portion relative to the frame and body of the vehicle irrespective of bodily movements in said transmission.

6. A transmission control mechanism including a transmission having a ball lever stack extending transversely of the vehicle, a ball lever in said stack arranged to have a portion thereof extending within the transmission and another portion thereof outside the transmission disposed to overhang a part of that portion within the transmission, an actuated gear selecting and gear shifting member and a reaction member secured to said portion outside of the transmission to maintain the position of said portion relative to the frame and body of the vehicle irrespective of bodily movements in said transmission.

7. In combination, a motor vehicle having a frame, a body, and a power unit mounted for limited bodily movement with respect to said frame in response to torque and inertia reactions, a transmission carried by said power unit having a ball lever projecting therefrom, means to move said transmission ball lever to effect gear selecting and gear shifting within said transmission and means to compensate for the bodily movement of said transmission with respect to said frame and body comprising a reaction link connected to said frame at one end thereof and to said ball lever at the other end thereof.

8. In combination, a motor vehicle having a frame and body and a transmission ball lever stack arranged to project upwardly with respect to the body of the vehicle, a ball lever projecting from said stack having an end portion bent at an angle with respect to the vertical axis of said ball lever stack and lying adjacent the horizontal plane of the ball of said lever, a lever supported in said vehicle above the level of said ball lever for movement about axes extending transversely to each other, and a link connecting said lever and said bent end portion of said ball lever to translate the movements of said lever into gear selecting and gear shifting movements of said ball lever.

9. In combination, a motor vehicle having a frame and a body and a transmission ball lever stack arranged to project upwardly with respect to the body of the vehicle, a ball lever projecting from said stack having an end portion bent at an angle with respect to the vertical axis of said ball lever stack, a lever supported in said vehicle above the level of said ball lever for movement about axes extending transversely to each other, and a link connecting said lever and said bent end portion of said ball lever to translate the swinging movements of said lever into gear selecting movements of said ball lever.

10. In combination, a motor vehicle having a frame and body, a power unit mounted for limited bodily movement with respect to said frame and body in response to torque or inertia reactions, a transmission carried by said unit and movable therewith, said transmission provided with a ball lever to effect gear selecting and gear shifting therein, ball lever actuating means connected to said ball lever and arranged to extend within said body to a position conveniently accessible to the operator, and a reaction means to compensate for bodily movements of the transmission including a member secured to said frame and to said ball lever.

11. In combination, a motor vehicle having a body and a power unit, a transmission on said power unit provided with a ball lever to effect gear selecting and gear shifting therein and extending forwardly therefrom, control means for said ball lever including a control lever pivotally supported above said ball lever and within said body upon axes extending transversely with respect to each other, and a rigid link connected to the forward ends of said ball lever and said control lever.

12. In combination a motor vehicle having a body and a power unit, a transmission carried by said power unit provided with a ball lever to effect gear selecting and gear shifting therein, and a control mechanism for said ball lever including an operator's lever supported by said vehicle body above and spaced from said ball lever and rotatable upon a pair of axes extending transversely with respect to each other and a link connecting and supported solely by said operator's lever and said ball lever, said link being rotatable about substantially its own axis to transmit movements of said operator's lever to said ball lever.

13. In combination, a motor vehicle having a body including an instrument panel, and a power unit, a transmission carried by said power unit provided with a ball lever to effect gear selecting and gear shifting therein, and a control mechanism for said ball lever including an operator's lever supported by said vehicle body instrument panel to rotate upon a pair of axes extending transversely with respect to each other and a rigid link connecting the free ends of said levers and supported thereby to transmit force and motion from the one lever to the other.

14. In a motor vehicle having a change speed mechanism, the combination of a lever member mounted on said mechanism for pivotal movement about two axes transversely disposed, a second lever member mounted in said vehicle and spaced from said first named lever and mounted for pivotal movement about axes transverse to each other, a link member connected to and supported by said lever members at its opposite ends respectively, one of said members having a bent portion adjacent its point of connection to another of said members, and a connector pivotally receiving the bent portion of said member and pivotally engaging said adjacent member whereby movement of one of said lever members about one axis tends to rotate said link member without substantial bodily displacement of at least one end thereof and move the other lever member about one of its axes, and whereby motion of one of said lever members about its other axis imparts longitudinal bodily movement to said link member and movement of the other lever member about the other of its axes.

CYRUS B. KURTZ.